H. G. GILLMOR.
EXPANDER FOR PIPES, TUBES, &c.
APPLICATION FILED MAR. 23, 1908.
1,081,496.  Patented Dec. 16, 1913.
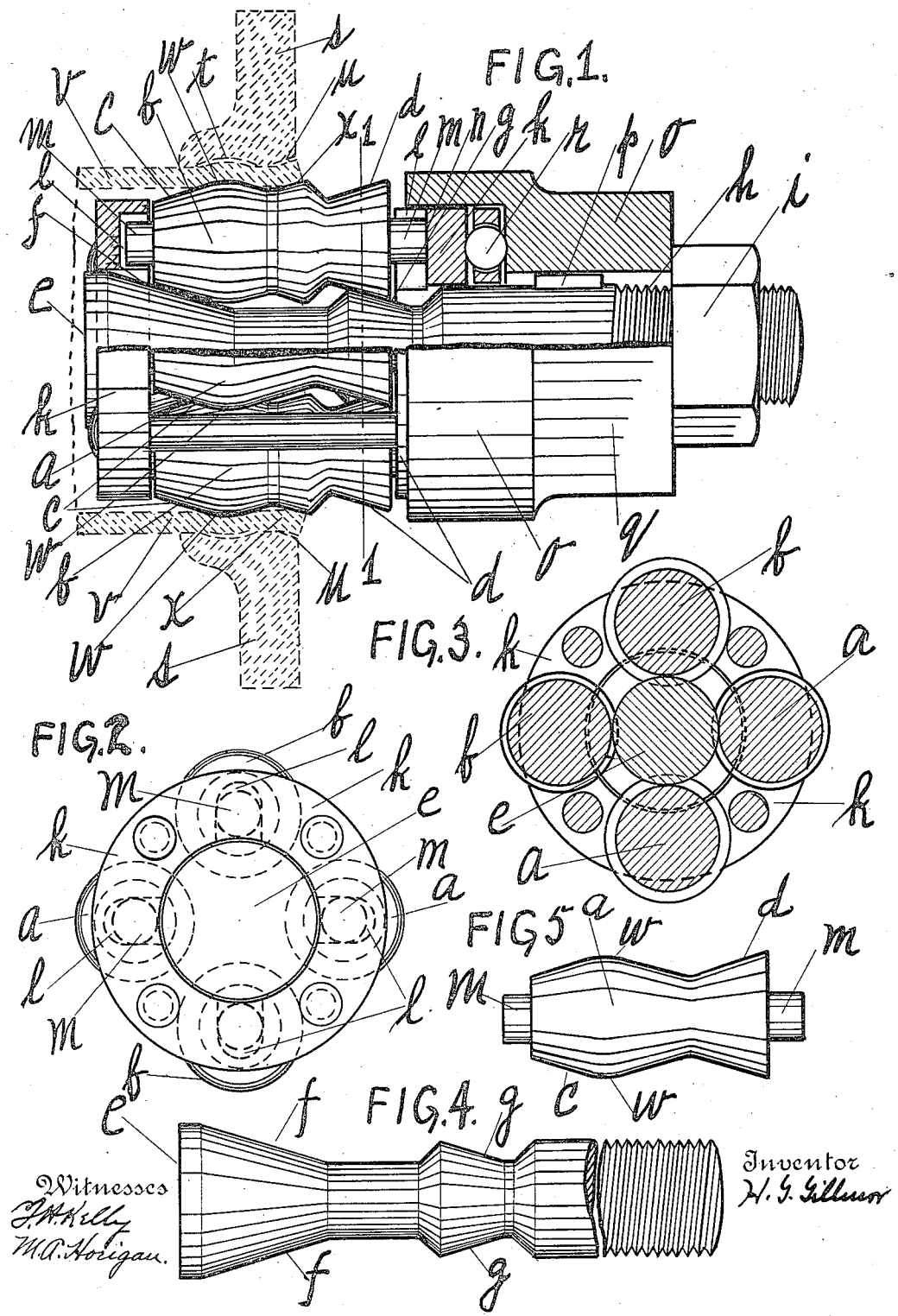

UNITED STATES PATENT OFFICE.

HORATIO G. GILLMOR, OF QUINCY, MASSACHUSETTS.

EXPANDER FOR PIPES, TUBES, &c.

1,081,496.  Specification of Letters Patent.  Patented Dec. 16, 1913.

Application filed March 23, 1908. Serial No. 422,769.

*To all whom it may concern:*

Be it known that I, HORATIO G. GILLMOR, a citizen of the United States, residing at Quincy, county of Norfolk, State of Massachusetts, have invented a new and useful Expander for Pipes, Tubes, &c., of which the following is a specification.

My invention relates to expanders for pipes, tubes, etc., and one of the objects of my invention is to produce a simple and efficient expander which shall be compact and so easy to operate as to be adapted to be operated by hand.

Another object of the invention is to produce an expander which may be employed for flaring the ends of the pipes or tubes, and expanding the outer surfaces of the flared ends into intimate contact with flared surfaces of flanges, plates, heads, sockets, etc.

Further objects will hereinafter appear and to these ends the invention consists of an expander for carrying out the above objects embodying the features of construction, combination of elements, and arrangement of parts, substantially as hereinafter described and claimed in this specification, and shown in the accompanying drawings, in which,—

Figure 1 is a side elevation, partly in section, showing the position of the expander with relation to a pipe and flange when expanding a pipe into a flange and flaring the end of the pipe. Figs. 2 and 3 are, respectively, an end view of the expander and a section at the plane indicated by 1, 1 in Fig. 1. Figs. 4 and 5 are, respectively, the mandrel or spindle and one of the types of rolls used.

Similar letters refer to similar parts throughout the several views.

($a$) and ($b$) represent hardened steel rolls one of the ends of which are tapered as indicated at ($c$) and the other ends of which are formed with conical surfaces ($d$) inclining toward the tapered end of the rollers.

($e$) is a spindle or mandrel constructed with conical surfaces ($f$) and ($g$) corresponding to the surfaces ($c$) and ($d$) of the rolls. The other end of the mandrel is constructed with screw threads ($h$) and fitted with a nut ($i$). The rolls are retained in position circumferentially by the cage ($k$) provided with slots ($l$) which receive pivots ($m$) formed upon the ends of the rolls so that the rolls may rotate and also have limited radial movement in the cage. The cage is arranged to bear upon the end of the rolls at ($n$) to take the end thrust upon the rolls. A sleeve ($o$) is free to move laterally upon the mandrel but is prevented from turning upon it by a key ($p$) so that turning the sleeve by means of a wrench applied to the surfaces ($q$), or otherwise, will cause the mandrel to rotate. The other end of the sleeve is bored out to receive one end of the cage and arranged to receive the friction reducing bearing ($r$), which is preferably of the ball or roller type, through which the end thrust of the rolls upon the cage is transmitted to the sleeve.

In dotted lines are shown in section a pipe flange ($s$) constructed with interior surfaces ($t$) and flared surface ($u$) at the face end of the flange. The pipe ($v$) is indicated in process of being expanded into the flange ($s$). Surfaces ($w$) of the rolls ($a$) and ($b$) are formed to correspond to the interior surfaces ($t$) of the flange ($s$) and other surfaces ($x$) upon the rolls ($b$) only are constructed to correspond to the flaring surfaces ($u$) at the face end of the flange.

The expander is operated by inserting it in the pipe, after the flange has been placed in position, until the surfaces ($w$) are approximately opposite the interior surfaces ($t$) of the flange. Setting up the nut ($i$) forces the sleeve ($o$), the cage ($k$) and the rolls ($a$) and ($b$) endwise upon the mandrel and so forces the rolls outward through the contact of the conical surfaces ($c$) and ($d$) of the rolls with the conical surfaces ($f$) and ($g$) of the mandrel. When the rolls have thus been forced out into contact with the interior of the pipe rotation of the expander, by means of a wrench applied at ($q$), or otherwise, causes the rolls to revolve and roll the material of the pipe. The nut ($i$) is set up from time to time and the rotation of the expander continued until the complete expansion of the pipe into the flange has been effected.

The rolls ($a$) are preferably made slightly greater in diameter than the rolls ($b$) so that they will come into action upon the interior of the pipe somewhat in advance of the rolls ($b$) and the surfaces of the rolls ($a$) so form a path for the surfaces ($w$) of the rolls ($b$). The surfaces ($x$) upon the rolls ($b$) corresponding to the flaring surfaces ($u$) of the flange will roll the flare upon the end of the pipe and the surfaces ($w$) of the rolls ($b$) following the path of the rolls ($a$) retain the rolls ($b$) against the tendency to end displacement which the thrust upon the surfaces ($x$) introduces.

The expander might be arranged with a greater number of each of the rolls ($a$) and ($b$) than illustrated in the drawings, three or more of each being employed. It might also be constructed with three or more rolls such as ($a$), only, or with three or more of the rolls ($b$), only; and, in some cases, it would be desirable to employ first an expander constructed with three or more of the rolls ($a$) only for expanding the pipe into contact with the surfaces ($t$) at the interior of the flange; and then to expand the flare upon the end of the pipe by employing an expander constructed with three or more of the rolls ($b$). The sleeve ($o$) might also be constructed with female threads, the key ($p$) be omitted and the sleeve screwed into the spindle, the end of which could be squared or otherwise arranged to be held while the sleeve is screwed into it, to give the necessary endwise movement of the cage and rolls. The friction reducing bearing might also be omitted and the cage be made to bear directly upon the sleeve or a friction washer between the sleeve and cage. Other modifications in the construction of the expander might be made without departing from the spirit of the invention. Obviously also some features of this invention may be used without others and the invention may be embodied in widely varying forms.

Therefore, without limiting the invention to the construction shown and described, or enumerating equivalents, what I claim and desire to secure Letters Patent for is:

1. The combination of a plurality of rolls constructed with a plurality of parallel conical surfaces, and a mandrel having a plurality of parallel conical surfaces adapted to bear upon the parallel conical surfaces of said rollers.

2. An expander, including, in combination with a plurality of rollers constructed with a plurality of parallel conical surfaces, a mandrel constructed with a plurality of parallel conical surfaces adapted to bear upon the parallel conical surfaces of said rollers, and a means for forcibly changing the longitudinal position of said mandrel with respect to said rollers, and thereby forcing said rollers outwardly from the axis of said mandrel.

3. An expander, including, in combination with forming rolls having bodies constructed to shape by rolling surfaces of a tube and a plurality of parallel conical surfaces, a mandrel constructed with a plurality of parallel conical surfaces adapted to have rolling contact with conical surfaces of said rolls, and means whereby the relative positions of said rolls in relation to said mandrel may be changed endwise to change the positions of the axes thereof radially from the axis of said mandrel.

4. The combination of a plurality of rolls constructed with a plurality of parallel conical surfaces, a spindle having a plurality of parallel conical surfaces adapted to bear upon conical surfaces of said rolls, means for retaining said rolls in position circumferentially about said spindle, and means for changing the longitudinal position of contact of said rolls with said spindle, substantially as described.

5. The combination of rolls and a mandrel having a plurality of parallel conical surfaces adapted to contact with and drive said rolls, with secondary rolls, contacting with and driven by the conical surfaces of said mandrel, constructed with surfaces adapted to expand and flare the end of a pipe.

6. An expander, including, in combination with rolls and a mandrel having a plurality of parallel conical surfaces adapted to contact with and drive said rolls, secondary rolls, contacting with and adapted to be driven by said mandrel, constructed with surfaces adapted to expand and flare the end of a tube and means for changing the endwise position of said mandrel with respect to said rolls.

7. An expander comprising a spindle having a plurality of conical surfaces inclined in the same direction, a plurality of rolls, each having a plurality of conical surfaces adapted to contact with and roll upon conical surfaces of said spindle, a cage constructed to retain said rolls in position circumferentially about said spindle and permit rotation and limited radial movement of said rolls in said cage, and means whereby the lateral position of said spindle with respect to said rolls and cage may be changed, substantially as and for the purposes described.

8. An expander comprising a mandrel constructed with a plurality of parallel conical surfaces, rolls constructed with a plurality of parallel conical surfaces adapted to contact with and roll upon the conical surfaces of said mandrel, means for retaining said rolls in position circumferentially while permitting rotation and limited radial movement of said rolls, a sleeve constructed to move laterally but prevented from revolution upon said mandrel, constructed to overcome the end thrust upon said rolls and cage, and means whereby said sleeve may be moved laterally upon said mandrel against an opposing end thrust thereon, substantially as and for the purposes described.

9. An expander comprising a spindle constructed with a plurality of parallel conical surfaces, a plurality of rolls having a plurality of parallel conical surfaces adapted to contact with and roll upon the conical surfaces of said mandrel, a cage constructed to receive the end thrust upon said rolls and retain said rolls in position circumferentially about said spindle, while permitting rotation and limited radial movement of said rolls, a friction reducing bearing in contact with said cage at one side, a sleeve upon said spindle in contact with said friction reducing bearing at the other side thereof, and means whereby said sleeve may be moved laterally upon said spindle against the end thrust of said rolls and cage thereon, substantially as and for the purposes described.

10. An expander, including, in combination with a plurality of rolls constructed with a plurality of parallel conical surfaces, a mandrel having a plurality of parallel conical surfaces adapted to contact with and drive said rolls, means for changing the endwise position of said rolls in relation to said mandrel and thereby changing the effective diameter of the path of said rolls, and a friction reducing bearing to take the endwise thrust upon said rolls, substantially as described.

11. An expander, including, in combination, a mandrel having a plurality of parallel conical surfaces, a plurality of rolls with corresponding conical surfaces, a cage constructed to retain said rolls in position and prevent rotation and limited radial movement thereof, friction reducing means carried by said cage to take the endwise thrust upon said rolls, and means for changing the position of said rolls in relation to said mandrel and thereby vary the effective diameter of the path of said rolls, substantially as described.

In testimony whereof I have signed this specification in the presence of two subscribing witnesses.

H. G. GILLMOR.

In the presence of—
THOMAS H. KELLY,
MICHAEL A. HORIGAN.

---

Copies of this patent may be obtained for five cents each, by addressing the "Commissioner of Patents, Washington, D. C."